ns012394859B2

United States Patent
Yang et al.

(10) Patent No.: US 12,394,859 B2
(45) Date of Patent: Aug. 19, 2025

(54) BATTERY, POWER CONSUMPTION DEVICE, METHOD AND DEVICE FOR PRODUCING BATTERY

(71) Applicant: CONTEMPORARY AMPEREX TECHNOLOGY (HONG KONG) LIMITED, Hong Kong (CN)

(72) Inventors: Piaopiao Yang, Ningde (CN); Xiaobo Chen, Ningde (CN); Yao Li, Ningde (CN); Xianda Li, Ningde (CN); Jinru Yue, Ningde (CN); Mingguang Gu, Ningde (CN); Lu Hu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 961 days.

(21) Appl. No.: 17/462,655

(22) Filed: Aug. 31, 2021

(65) Prior Publication Data

US 2022/0320673 A1 Oct. 6, 2022

Related U.S. Application Data

(63) Continuation of application No. PCT/CN2021/084428, filed on Mar. 31, 2021.

(51) Int. Cl.
*H01M 50/317* (2021.01)
*H01M 10/613* (2014.01)
(Continued)

(52) U.S. Cl.
CPC ....... *H01M 50/317* (2021.01); *H01M 10/613* (2015.04); *H01M 50/147* (2021.01);
(Continued)

(58) Field of Classification Search
None
See application file for complete search history.

(56) References Cited

U.S. PATENT DOCUMENTS

| 8,277,965 | B2 | 10/2012 | Hermann et al. |
| 8,361,642 | B2 | 1/2013 | Hermann et al. |

(Continued)

FOREIGN PATENT DOCUMENTS

| CN | 206401400 U | 8/2017 |
| CN | 109417145 A | 3/2019 |

(Continued)

OTHER PUBLICATIONS

Kobayashi (JP2017147128A) translation to English provided by Espacenet (Year: 2017).*

(Continued)

*Primary Examiner* — Haroon S. Sheikh
*Assistant Examiner* — Claire A Rutiser
(74) *Attorney, Agent, or Firm* — Scully, Scott, Murphy & Presser, P.C.

(57) ABSTRACT

Embodiments of the present application provides a battery, a power consumption apparatus, a method and an apparatus for producing the battery. The battery includes: a battery cell, the battery cell including a pressure relief mechanism, the pressure relief mechanism being disposed on a first wall of the battery cell; a first surface of the thermal management component being attached to the first wall; and a support, the support being arranged opposite to the pressure relief mechanism, the support being configured to support the pressure relief mechanism when the pressure relief mechanism is actuated, so that the pressure relief mechanism is opened at a predetermined angle, therefore emissions from the battery cell can be discharged toward the thermal management component. The technical solutions of embodi- (Continued)

ments of the present application can enhance safety of batteries.

19 Claims, 7 Drawing Sheets

(51) Int. Cl.
*H01M 50/147* (2021.01)
*H01M 50/209* (2021.01)

(52) U.S. Cl.
CPC ...... *H01M 50/209* (2021.01); *H01M 2200/20* (2013.01); *H01M 2220/20* (2013.01)

(56) References Cited

U.S. PATENT DOCUMENTS

| | | | |
|---|---|---|---|
| 8,367,233 B2 | 2/2013 | Hermann et al. | |
| 11,316,230 B1* | 4/2022 | Boecker | H01M 10/6556 |
| 2007/0275294 A1* | 11/2007 | Stearns | H01M 50/3425 |
| | | | 429/82 |
| 2010/0136391 A1* | 6/2010 | Prilutsky | H01M 10/6566 |
| | | | 429/62 |
| 2010/0273034 A1 | 10/2010 | Hermann et al. | |
| 2012/0308858 A1 | 12/2012 | Hermann et al. | |
| 2012/0308859 A1 | 12/2012 | Hermann et al. | |
| 2019/0157636 A1 | 5/2019 | Miler et al. | |
| 2021/0175577 A1 | 6/2021 | Shiotani et al. | |

FOREIGN PATENT DOCUMENTS

| | | |
|---|---|---|
| CN | 209104274 U | 7/2019 |
| CN | 110335974 A | 10/2019 |
| CN | 111584792 A | 8/2020 |
| CN | 111668410 A | 9/2020 |
| CN | 112018303 A | 12/2020 |
| CN | 112072046 A | 12/2020 |
| CN | 112086605 A | 12/2020 |
| DE | 102017212223 A1 | 1/2019 |
| EP | 3675205 A1 | 7/2020 |
| JP | 2017147128 A | 8/2017 |
| JP | 6746962 B2 | 8/2020 |
| KR | 20180083566 A | 7/2018 |
| KR | 20190089121 A | 7/2019 |

OTHER PUBLICATIONS

Shu (CN 206401400 U) translation to English provided by Espacenet (Year: 2017).*
Lee (KR 20180086566A) translation to English provided by Espacenet (Year: 2018).*
Notification to Grant Patent Right for Invention dated Oct. 16, 2023 received in Chinese Patent Application No. CN 202180000893.8.
Extended European Search Report dated Aug. 17, 2022 received in European Patent Application No. EP 21754878.3.
Notification of Reasons for Refusal dated Oct. 15, 2024 received in Japanese Patent Application No. 2023-547157.
Notice of Preliminary Rejection dated Jun. 11, 2025 received in Korean Patent Application No. 10-2023-7025808.

* cited by examiner

BATTERY, POWER CONSUMPTION DEVICE, METHOD AND DEVICE FOR PRODUCING BATTERY

CROSS-REFERENCE TO RELATED APPLICATIONS

This application is a continuation of International Application No. PCT/CN2021/084428, filed on Mar. 31, 2021, the disclosure of which is hereby incorporated by reference in its entirety.

TECHNICAL FIELD

The present application relates to the field of batteries technologies, and in particular, to a battery, a power consumption apparatus, and a method and apparatus for producing a battery.

BACKGROUND

Energy saving and emission reduction are the key to a sustainable development of automotive industry. In this case, electric vehicles have become an important part of the sustainable development of the automotive industry due to their advantages of energy saving and environmental protection. For the electric vehicles, battery technology is an important factor for their development.

In the development of the battery technology, in addition to improving the performance of a battery, safety is also an issue that cannot be ignored. If the safety of the battery cannot be ensured, the batteries cannot be used. Therefore, how to enhance the safety of the battery is an urgent technical problem to be solved in the battery technology.

SUMMARY

Embodiments of the present application provides a battery, a power consumption apparatus, and a method and an apparatus for producing a battery, which can enhance safety of batteries.

In a first aspect, a battery is provided, including: a battery cell, the battery cell comprising a pressure relief mechanism, the pressure relief mechanism being disposed on a first wall of the battery cell and the pressure relief mechanism being configured to be actuated when an internal pressure or temperature of the battery cell reaches a threshold, to relieve the internal pressure; a thermal management component being configured to accommodate a fluid to adjust the temperature of the battery cell, and a first surface of the thermal management component being attached to the first wall; and a support, the support being arranged opposite to the pressure relief mechanism, the support being configured to support the pressure relief mechanism when the pressure relief mechanism is actuated, so that the pressure relief mechanism is opened at a predetermined angle, therefore emissions from the battery cell can be discharged toward the thermal management component.

In the technical solutions of the embodiments of the present application, by disposing the support corresponding to the pressure relief mechanism, when the pressure relief mechanism is actuated, the support can support the pressure relief mechanism and prevent the pressure relief mechanism from being fully opened, so that the pressure relief mechanism is opened at the predetermined angle. Emissions from the battery cell can pass through an opening of the predetermined angle opened by the pressure relief mechanism and directionally discharging toward the thermal management component accommodating the fluid, so that the emissions from the battery cell can contact the thermal management component, thereby the thermal management component can cool the emissions from the battery cell.

In some embodiments, there is a gap between the support and the pressure relief mechanism, and the gap is configured to provide open space for the pressure relief mechanism.

The gap is arranged between the support and the pressure relief mechanism, which can provide open space for the pressure relief mechanism to be actuated, so that the pressure relief mechanism can be smoothly actuated, and the emissions from the battery cell can be smoothly discharged from the pressure relief mechanism.

In some embodiments, the pressure relief mechanism is provided with a weakened region and a connection region, the weakened region and the connection region form a ring, so that when the pressure relief mechanism is actuated, the pressure relief mechanism can be ruptured at the weakened region and be opened at a predetermined angle.

The weakened region and the connection region are disposed on the pressure relief region, and the ring is formed by the weakened region and the connection region. Furthermore, when the pressure relief mechanism is actuated, the pressure relief mechanism can be ruptured at the weakened region and be opened at a predetermined angle with respect to the connection region, so that the emissions from the battery cell can be discharged from the pressure relief mechanism, reducing a risk of the emissions and improving the safety of the battery.

In some embodiments, an orthographic projection of a farthest point in the weakened region on the first surface is staggered from an orthographic projection of the support on the first surface, the farthest point is a point farthest from the connection region on the weakened region.

The orthographic projection of the farthest point in the weakened region on the first surface is staggered from the orthographic projection of the support on the first surface, which can ensure that the pressure relief mechanism is ruptured at the weakened region and the weakened region can be opened at a large enough angle when the pressure relief mechanism is actuated, so that the emissions discharged through the pressure relief mechanism have a large enough contact area with the thermal management component, bringing a better cooling effect. In this case, the weakened region can be opened at a large enough angle, which can reduce the problem of the further thermal runaway of the battery cell caused by an untimely discharge of the emissions due to a small angle opened by the weakened region.

In some embodiments, an extension direction of the support is parallel to an extension direction of the connection region, the extension direction of the connection region is a direction pointing from one end connecting the connection region and the weakened region to the other end connecting the connection region and the weakened region, and the extension direction of the support is a length direction of the support.

In some embodiments, the weakened region may be a score. For example, a shape of the score comprises at least one of the following: a "C" shape, a "Z" shape, and an "S" shape.

In some embodiments, a structure of the support is a strip structure.

The support is set as the strip structure, which is easy to implement and with low cost.

In some embodiments, a width of an intermediate region of the strip structure is greater than that of two end regions of the strip structure.

By setting the support of the strip structure as a structure with a large width in the intermediate region and a small width in the two end areas, a stiffness of the support may be increased to enable the support to better support the pressure relief mechanism.

In some embodiments, the thermal management component is provided with a pressure relief hole, the pressure relief hole is arranged opposite to the pressure relief mechanism, and the pressure relief hole is configured to discharge the emissions.

By disposing the pressure relief hole corresponding to the pressure relief mechanism on the thermal management mechanism, when the pressure relief mechanism is actuated, the emissions from the battery cell can pass through the thermal management component and be discharged toward a side away from the battery cell, reducing the risk of the emissions and improving the safety of the battery.

In some embodiments, the support covers part of the pressure relief hole, and an area of the support covering the pressure relief hole is less than or equal to 30% of an area of the pressure relief hole.

The area of the support covering the pressure relief hole is set no more than 30%, which can prevent the support from covering too much the area of the pressure relief hole. When the pressure relief mechanism is actuated, the emissions from the battery cell can pass through the thermal management component in time without accumulating at the thermal management component.

In some embodiments, the support is arranged in the pressure relief hole.

By arranging the support in the pressure relief hole, space in the pressure relief hole may be fully utilized, which makes a structure of the battery compact, improving an energy density of the battery.

In some embodiments, a structure of the support is a hollow structure, the support accommodates a fluid, and the support is configured to be damaged by the emissions when the pressure relief mechanism is actuated, so that the fluid in the support is discharged to reduce temperature of the emissions from the battery cell.

The support is set as the hollow structure, and the fluid is accommodated in the support. Furthermore, when the pressure relief mechanism is actuated, the support can be easily damaged by the emissions, so that the fluid in the support is discharged to achieve a goal of cooling the battery cell.

In some embodiments, a plurality of pressure relief holes are arranged opposite to one support.

The plurality of pressure relief holes on the thermal management component are arranged opposite to one support, which is easy to implement and with low cost.

In some embodiments, a melting point of the support is lower than 600° C.

In some embodiments, the thermal management component is configured to be damaged by the emissions discharged at the predetermined angle when the pressure relief mechanism is actuated, so that the fluid in the thermal management component is discharged from the interior of the thermal management component.

When the pressure relief mechanism is actuated, the thermal management component can be damaged by the emissions from the battery cell discharged at the predetermined angle, so that the fluid in the thermal management component is discharged from the interior of the thermal management component to cool the battery cell.

In some embodiments, the thermal management component is provided with a temperature-sensitive material, the temperature-sensitive material is configured to be melted by the emissions discharged at the predetermined angle when the pressure relief mechanism is actuated, so that the fluid is discharged from the interior of the thermal management component.

By disposing the temperature-sensitive material on the thermal management component, when the pressure relief mechanism is actuated, the temperature-sensitive material on the thermal management component can be melted by the emissions discharged at the predetermined angle, so that the thermal management component can be more easily damaged, and the fluid is discharged from the interior of the thermal management component to quickly cool the battery cell.

In some embodiments, the temperature-sensitive material is disposed on a region of the thermal management component facing the emissions discharged at the predetermined angle.

By disposing the temperature-sensitive material on the region of the thermal management component facing the emissions discharged at the predetermined angle, the thermal management component can be more easily damaged by the emissions.

In a second aspect, a power consumption apparatus is provided, including: such as the battery of the first aspect.

In a third aspect, a method for producing a battery is provided, including: providing a battery cell, the battery cell comprising a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; providing a thermal management component being configured to accommodate a fluid to adjust the temperature of the battery cell, and a first surface of the thermal management component being attached to the first wall; and providing a support, the support being arranged opposite to the pressure relief mechanism, the support being configured to support the pressure relief mechanism when the pressure relief mechanism is actuated, so that the pressure relief mechanism is opened at a predetermined angle, therefore the emissions from the battery cell can be discharged toward the thermal management component.

In a fourth aspect, an apparatus for producing a battery is provided, including: a provision module configured to: provide a battery cell, the battery cell comprising a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; provide a thermal management component being configured to accommodate a fluid to adjust the temperature of the battery cell, and a first surface of the thermal management component being attached to the first wall; and provide a support, the support being arranged opposite to the pressure relief mechanism, the support being configured to support the pressure relief mechanism when the pressure relief mechanism is actuated, so that the pressure relief mechanism is opened at a predetermined angle, therefore emissions from the battery cell can be discharged toward the thermal management component.

BRIEF DESCRIPTION OF DRAWINGS

In order to illustrate the technical solutions in embodiments of the present application more clearly, brief description will be made below to drawings required in the embodiments of the present application, and apparently, the drawings described below are some embodiments of the present application only, and other drawings could be obtained based on these drawings by those ordinary skilled in this art without creative efforts.

Figure 1:
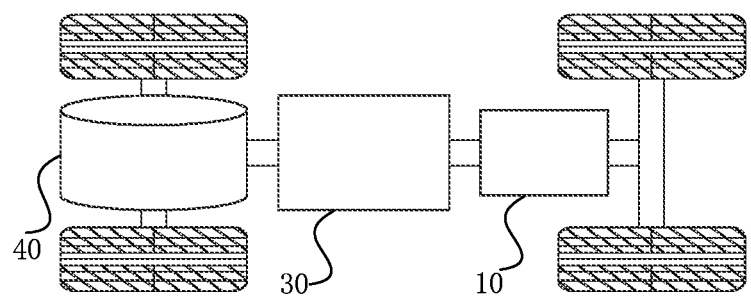
FIG. 1 is a schematic structural diagram of a vehicle disclosed in an embodiment of the present application.

In the drawings, the drawings are not drawn to actual scale.

DESCRIPTION OF EMBODIMENTS

The following describes implementations of the present application in detail with reference to accompany drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that unless otherwise provided, "a plurality of" means more than two (including two); the terms "up", "down", "left", "right", "inside", "outside" and the like are orientations or positional relationship, and the terms are merely for convenience of describing the present application and for simplifying the description, rather than for indicating or implying that an apparatus or element must have a specific orientation, and must be constructed and operated in a specific orientation, which thus may not be understood as limiting the present application. In addition, the terms "first", "second", "third" and the like are only intended for the purpose of description, and shall not be understood as an indication or implication of relative importance. "Vertical" is not strictly vertical, but within the allowable range of error. "Parallel" is not strictly parallel, but within the allowable range of error.

The orientation words appearing in the following description are the directions shown in the figures, which are not intended to limit the specific structure of the present application. In the description of the present application, it should be also noted that unless otherwise explicitly specified and defined, the terms "mounting", "connecting", "connection" and "attaching" should be understood in a broad sense, for example, they may be a fixed connection, a detachable connection, or an integrated connection; and they may be a direct connection or an indirect connection via an intermediate medium. Those of ordinary skill in the art can understand the specific meanings of the foregoing terms in the present application according to specific conditions.

The term "and/or" in the present application describes only an association relationship for describing associated objects and represents that three relationships may exist. For example, A and/or B may represent the following three cases: only A exists, both A and B exist, and only B exists. In addition, the character "/" in the present application generally indicates that the associated objects before and after the character are in an "or" relationship.

In the present application, "a plurality of" means more than two (including two), similarly, "a plurality of groups" means more than two groups (including two groups), and "a plurality of sheets" means more than two sheets (including two sheets).

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or in another shape, which are not limited by the embodiments of the present application. The battery cell is generally divided into three types according to the way of packaging: a cylindrical battery cell, a prismatic battery cell and a pouch battery cells, which is not limited by the embodiments of the present application.

A battery mentioned in the embodiments of the present application refers to a single physical module that includes one or more battery cells to provide a higher voltage and capacity. For example, the battery mentioned in the present application may include a battery module or a battery pack, etc. The battery generally includes a case for enclosing one or more battery cells. The case can prevent liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, the current collector not coated with the positive electrode active material layer protrudes from the current collector coated with the positive electrode active material layer, and the positive electrode current collector not coated with the positive electrode active material layer is used as a positive electrode tab. Taking a lithium-ion battery as an example, a material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, the current collector not coated with the negative electrode active material layer protrudes from the current collector coated with the negative electrode active material layer, and the current collector not coated with the negative electrode active material layer is used as the negative electrode tab. A material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. A material of the isolation film may be PP, PE, or the like. In addition, the electrode assembly may have a coiled structure or a laminated structure, and the embodiments of the present application are not limited thereto.

With the development of battery technology, it is necessary to consider many design factors, such as energy density, cycle life, discharge capacity, C-rate and other performance parameters. In addition, safety of batteries should also be considered.

With respect to the battery cell, the main safety hazards come from the charging and discharging processes, and a suitable environmental temperature design is also required. In order to effectively avoid unnecessary losses, at least triple protection measures are generally taken for the battery cell. Specifically, the protection measures include at least a switching element, a properly selected isolation film material and a pressure relief mechanism. The switching element refers to an element that can stop the charging or discharging of the battery when the temperature or resistance in the battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated to release an internal pressure or temperature when the internal pressure or temperature of the battery cell reaches a predetermined threshold. The threshold design is different according to different design requirements. The threshold may depend on the material of one or more of the positive electrode sheet, the negative electrode sheet, the electrolytic solution and the isolation film in the battery cell. The pressure relief mechanism may take the form of an anti-explosion valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for releasing the internal pressure or temperature.

The "actuation" mentioned in the present application means that the pressure relief mechanism acts or is activated to a certain state, so that the internal pressure and temperature of the battery cell can be released. The action generated by the pressure relief mechanism may include but is not limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure and temperature in the battery cell can be released at a controllable pressure or temperature, thereby avoiding potentially more serious accidents.

The emissions from the battery cell mentioned in the present application include but are not limited to: the electrolytic solution, dissolved or split positive and negative electrode sheets, fragments of the isolation film, high-temperature and high-pressure gas generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, that is, to discharge the emissions to the outside of the battery cell. However, in order to ensure an output voltage or current of the battery, a plurality of battery cells are often required and electrically connected to each other via a bus component. The emissions discharged from the interior of the battery cell may cause short circuit of the other battery cells. For example, when discharged metal scraps electrically connect two bus components, the battery may be short-circuited, thereby posing a potential safety hazard. Moreover, the high-temperature and high-pressure emissions are discharged in a direction of the pressure relief mechanism provided in the battery cell, and more specifically, may be discharged in a direction of a region where the pressure relief mechanism is actuated. The strength and destructive power of such emissions may be great, or may even be enough to break through one or more structures in this direction, causing further safety problems.

In view of this, the present application provides a technical solution, by disposing a support corresponding to a pressure relief mechanism, when the pressure relief mechanism is actuated, the support can support the pressure relief mechanism and prevent the pressure relief mechanism from being fully opened, so that the pressure relief mechanism is opened at a predetermined angle. Emissions from battery cell can pass through an opening of the predetermined angle opened by the pressure relief mechanism and directionally discharging toward the thermal management component accommodating the fluid, so that the emissions from the battery cell can contact the thermal management component, and even damage the thermal management component to make the fluid to flow out of the thermal management component, so as to cool the emissions from the battery cell, reduce a risk of the emissions and further improve the safety of the battery.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing apparatuses, but also applicable to all apparatuses using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be arranged inside the vehicle 1, and the controller 30 is used to control the battery 10 to supply power to the motor 40. For example, the battery 10 may be disposed at the bottom or the head or the tail of the vehicle 1. The battery 10 may be used to supply power to the vehicle 1. For example, the battery 10 may be used as an operation power supply of the vehicle 1 and is used for a circuit system of the vehicle 1, for example, for a working power demand of the vehicle 1 during startup, navigation and running In another embodiment of the present application, the battery 10 may be used not only as an operation power source of the vehicle 1, but also as a driving power source of the vehicle 1, replacing or partially replacing fuel or natural gas to provide driving power for the vehicle 1.

In order to meet different power requirements, the battery may include a plurality of battery cells, wherein the plurality of battery cells may be in series connection, parallel connection or series-parallel connection. The series-parallel connection refers to a combination of series connection and parallel connection. The battery may also be called a battery pack. Optionally, the plurality of battery cells may also be first connected in series, in parallel or in series and parallel to form battery modules, and then the multiple battery modules are connected in series, in parallel or in series and parallel to form a battery. That is, a plurality of battery cells may directly form a battery, or may first form battery modules, and then the battery modules form a battery.

Figure 2:
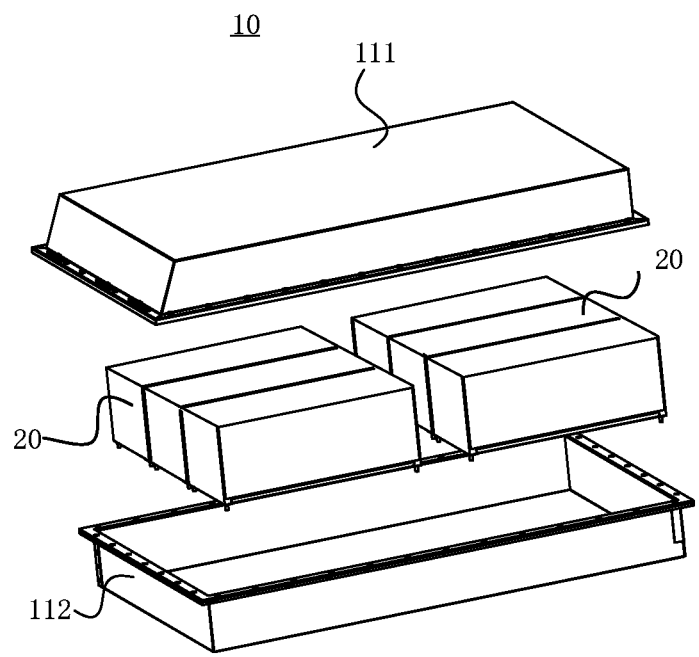
FIG. 2 is an exploded schematic structural diagram of a battery disclosed in an embodiment of the present application.

For example, FIG. 2 is a schematic structural diagram of a battery 10 provided in an embodiment of the present application, and the battery 10 may include a plurality of battery cells 20.

The battery 10 may further include a box (or a covering), the inside of the box is a hollow structure, and the plurality of battery cells 20 are accommodated in the box. As shown in FIG. 2, the box may include two portions, which are referred to as a first portion 111 and a second portion 112, respectively, and the first portion 111 and the second portion 112 are fastened together. The shapes of the first portion 111 and the second portion 112 may be determined according to the combined shape of the plurality of battery cells 20, and the first portion 111 and the second portion 112 may each have an opening. For example, the first portion 111 and the second portion 112 each may be a hollow cuboid and each have only one surface as an opening surface. The opening of the first portion 111 is arranged opposite to the opening of the second portion 112, and the first portion 111 and the second portion 112 are fastened to each other to form a box with a closed chamber. For another example, different from that shown in FIG. 2, only one of the first portion 111 and the second portion 112 may be a hollow cuboid with an opening, and the other may be a plate shape, so as to cover the opening. For example, the second portion 112 is a hollow cuboid and has only one surface as an opening surface, and the first portion 111 is a plate shape, then the first portion 111 covers at the opening of the second portion 112 to form a box with a closed chamber, and the chamber may be used to accommodate the plurality of battery cells 20. The plurality of battery cells 20 are combined in parallel connection or series connection or series-parallel connection and are then placed in the box formed by fastening of the first portion 111 and the second portion 112.

Optionally, the battery 10 may also include other structures, which will not be described in detail herein. For example, the battery 10 may also include a bus component. The bus component is configured to implement an electrical connection between the plurality of battery cells 20, such as parallel connection, series connection or series-parallel connection. Specifically, the bus component may implement the electrical connection between the battery cells 20 by connecting electrode terminals of the battery cells 20. Furthermore, the bus component may be fixed to the electrode terminals of the battery cells 20 by means of welding. Electrical energy of the plurality of battery cells 20 may be further led out through an electrically conductive mechanism passing through the box. Optionally, an electrically conductive mechanism may also belong to the bus component.

Figure 3:
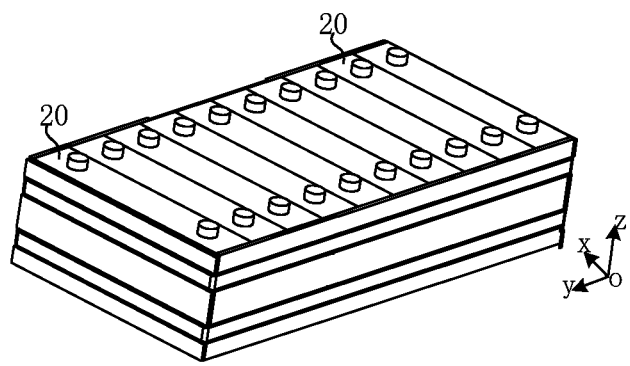
FIG. 3 is a schematic structural diagram of a battery module disclosed in to an embodiment of the present application.

According to different power requirements, the number of the battery cells 20 may be set to any value. The plurality of battery cells 20 can be connected in series, in parallel or in series and parallel to implement larger capacity or power. Since the number of the battery cells 20 included in each the battery 10 may be much, the battery cells 20 may be arranged in groups for convenience of installation, and each group of battery cells 20 constitutes a battery module, in order to facilitate installation. The number of the battery cells 20 included in the battery module is not limited and may be set as required. For example, FIG. 3 shows an example of a battery module. The battery 10 may include a plurality of battery modules, and these battery modules may be connected in series, in parallel or in series and parallel.

Figure 4:
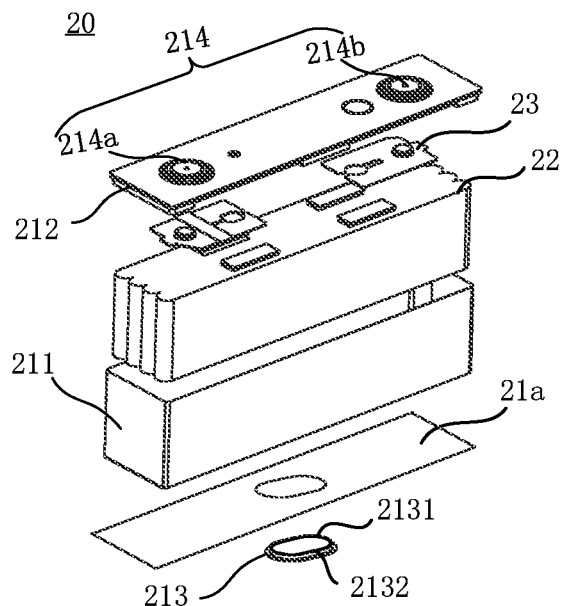
FIG. 4 is an exploded view of a battery cell disclosed in an embodiment of the present application.

FIG. 4 is a schematic structural diagram of a battery cell 20 provided in an embodiment of the present application. The battery cell 20 includes one or more electrode assemblies 22, a housing 211, a cover plate 212 and a pressure relief mechanism 213. The housing 211 and the cover plate 212 form a shell or a battery box 21. A wall of the housing 211 and a wall of the cover plate 212 are each referred to as a wall of the battery cell 20. The housing 211 is determined according to the combined shape of one or more electrode assemblies 22. For example, when the housing 211 may be a hollow cuboid or cube or cylinder, one surface of the housing 211 has an opening so that one or more electrode assemblies 22 can be placed in the housing 211. For example, when the housing 211 is the hollow cuboid or cube, one plane of the housing 211 is an opening surface, that is, the plane does not have a wall so that the inside and outside of the housing 211 are communicated. When the housing 211 may be a hollow cylinder, an end surface of the housing 211 is an opening surface, that is, the end surface does not have a wall so that the inside and outside of the housing 211 are communicated. The cover plate 212 covers the opening and is connected to the housing 211 to form a closed chamber in which the electrode assembly 22 is placed. The housing 211 is filled with an electrolyte, such as an electrolytic solution.

The battery cell 20 may further include two electrode terminals 214, and the two electrode terminals 214 may be arranged on the cover plate 212. The cover plate 212 is generally in the shape of a flat plate, and the two electrode terminals 214 are fixed on a flat plate surface of the cover plate 212. The two electrode terminals 214 are a first electrode terminal 214a and a second electrode terminal 214b, respectively. The polarity of the two electrode terminals 214 are opposite. For example, when the first electrode terminal 214a is a positive electrode terminal, the second electrode terminal 214b is a negative electrode terminal. Each electrode terminal 214 is correspondingly provided with a connecting member 23 also called a current collecting member 23, which is located between the cover plate 212 and the electrode assembly 22 and used to electrically connect the electrode assembly 22 to the electrode terminal 214.

As shown in FIG. 4, each electrode assembly 22 has a first electrode tab 221a and a second electrode tab 222a. The polarity of the first electrode tab 221a and the second electrode tab 222a are opposite. For example, when the first electrode tab 221a is a positive electrode tab, the second electrode tab 222a is a negative electrode tab. The first electrode tab 221a of the one or more electrode assemblies 22 is connected to one electrode terminal 214 through one connecting member 23, and the second electrode tab 222a of the one or more electrode assemblies 22 is connected to the other electrode terminal 214 through the other connecting member 23. For example, the positive electrode terminal is connected to the positive electrode tab through one connecting member 23, and the negative electrode terminal is connected to the negative electrode tab through the other connecting member 23.

In this battery cell 20, according to actual use requirements, there may be a single or a plurality of electrode assemblies 22. As shown in FIG. 4, there are four separate electrode assemblies 22 in the battery cell 20.

One wall of the battery cell 20, such as a first wall 21a shown in FIG. 4, may be further provided with the pressure relief mechanism 213. For convenience of display, the first wall 21a is separated from the housing 211 in FIG. 4, but this does not limit that a bottom side of the housing 211 has an opening. The pressure relief mechanism 213 is configured to be actuated when an internal pressure or temperature of the battery cell 20 reaches a threshold, to relieve the internal pressure or temperature.

The pressure relief mechanism 213 may be a portion of the first wall 21a or is split from the first wall 21a and fixed to the first wall 21a by means of welding, for example. When the pressure relief mechanism 213 is the portion of the first wall 21a, for example, the pressure relief mechanism 213 may be formed by disposing an indentation on the first wall 21a, and a thickness of the first wall 21a corresponding to the indentation is smaller than that of other regions of the pressure relief mechanism 213 except the indentation. The indentation is the weakest position of the pressure relief mechanism 213. When excessive gas generated by the battery cell 20 causes an internal pressure of the housing 211 to rise and reach a threshold, or an internal temperature of the battery cell 20 rises and reaches a threshold due to the heat generated by an internal reaction of the battery cell 20, the pressure relief mechanism 213 can be fractured at the indentation, resulting in a communication between the inside and outside of the housing 211. The gas pressure and temperature are released outward through the cracking of the pressure relief mechanism 213, thereby preventing the battery cell 20 from exploding.

Optionally, in an embodiment of the present application, as shown in FIG. 4, in the case where the pressure relief mechanism 213 is disposed on a first wall 21a of the battery cell 20, a second wall of the battery cell 20 is provided with electrode terminals 214 and is different from the first wall 21a.

Optionally, the second wall is arranged opposite to the first wall 21a. For example, the first wall 21a may be a bottom wall of the battery cell 20, and the second wall may be a top wall of the battery cell 20, that is, the cover plate 212.

The pressure relief mechanism 213 and the electrode terminals 214 are disposed on different walls of the battery cell 20, so that when the pressure relief mechanism 213 is actuated, the emissions from the battery cell 20 can be farther away from the electrode terminals 214, thereby reducing an impact of the emissions on the electrode terminals 214 and the bus component, thus enhancing the safety of the battery 10.

Further, when the electrode terminal 214s are disposed on the cover plate 212 of the battery cell 20, the pressure relief mechanism 213 is disposed on the bottom wall of the battery cell 20, so that when the pressure relief mechanism 213 is actuated, the emissions from the battery cell 20 are discharged toward the bottom of the battery 10. In this way, On the one hand a risk resulting from the emissions can be reduced by using the thermal management component, on the other hand the harm to users can be reduced because the bottom of the battery 10 is usually far away from the users.

The pressure relief mechanism 213 may be various possible pressure relief structures, which is not limited by the embodiments of the present application. For example, the pressure relief mechanism 213 may be a temperature-sensitive pressure relief mechanism configured to be capable of being melted when the internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

Furthermore, as shown in FIG. 4, the pressure relief mechanism 213 is provided with a weakened region 2131 and a connection region 2132, the weakened region 2131 and the connection region 2132 form a ring, so that the pressure relief mechanism 213 can be ruptured at the weakened region 2131 and be opened at a predetermined angle when the pressure relief mechanism 213 is actuated. Therefore, the emissions from the battery cell 20 may be discharged from the pressure relief mechanism 213, reducing the risk of the emissions and improving the safety of the battery 10.

In some embodiments, the weakened region 2131 may be formed from a fusible material, and a melting point of the connection region 2132 is higher than that of the weakened region 2131. In this way, when the pressure relief mechanism 213 is actuated, the pressure relief mechanism 213 may be melted in a region provided with the fusible material, and may be opened at a predetermined angle relative to the connection region 2132, so that the emissions from the battery cell 20 may be discharged from the pressure relief mechanism 213, improving the safety of the battery 10. In other embodiments, the weakened region 2131 may be an indentation, and a thickness or strength of the connection region 2132 is greater than that of the weakened region 2131. In this way, when the pressure relief mechanism 213 is actuated, the pressure relief mechanism 213 may be damaged at the indentation, so that the weakened region 2131 may be opened at a predetermined angle relative to the connection region 2132 and the emissions from the battery cell 20 may be discharged from the pressure relief mechanism 213, reducing the risk of the emissions and improving the safety of the battery 10.

Figure 5:
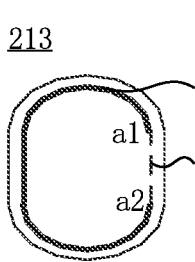
FIG. 5 is a schematic structural diagram of a pressure relief mechanism disclosed in some embodiments of the present application.
Figure 6:
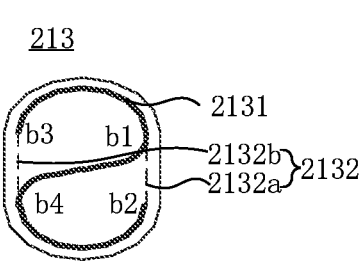
FIG. 6 is a schematic structural diagram of another pressure relief mechanism disclosed in some embodiments of the present application.
Figure 7:
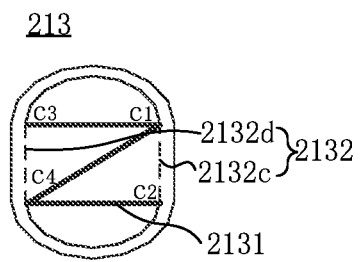
FIG. 7 is a cross-sectional schematic structural diagram of yet another pressure relief mechanism disclosed in some embodiments of the present application.

FIGS. 5-7 show schematic diagrams of the pressure relief mechanism 213 provided in the embodiment of the present application. Fox example, as shown in FIG. 5, a shape of the weakened region 2131 may be a "C" shape. For another example, as shown in FIG. 6, a shape of the weakened region 2131 may be an "S" shape. For yet another example, as shown in FIG. 7, a shape of the weakened region 2131 may be a "Z" shape.

In some embodiments, as shown in FIG. 5, the number of the connection region 2132 is one, for example, as shown by a dashed line between an a1 end and an a2 end, where the a1 end is an end connecting the weakened region 2131 and the connection region 2132, the a2 end is the other end connecting the weakened region 2131 and the connection region 2132. The number of the ring formed by the weakened region 2131 and the connection region 2132 is one, that is, a shape formed from the a1 end along the weakened region 2131 to the a2 end, and then from the a2 end along the connection region 2132 to the a1 end.

In other embodiments, as shown in FIG. 6, the number of the connection region 2132 is two, that is, a first connection region 2132a and a second connection 2132b, where the first connection region 2132a is shown by a dashed line between a b1 end and a b2 end, and the second connection region 2132b is shown by a dashed line between a b3 end and a b4 end, where the b1 end is an end connecting the weakened region 2131 and the first connection region 2132a, the b2 end is the other end connecting the weakened region 2131 and the first connection region 2132a, the b3 end is an end connecting the weakened region 2131 and the second connection region 2132b, and the b4 end is the other end connecting the weakened region 2131 and the second connection region 2132b. The number of the ring formed by the weakened region 2131 and the connection region 2132 is two, that is, a shape formed from the b1 end along the weakened region 2131 to the b4 end, then from the b4 end along the weakened region 2131 to the b2 end, and eventually from the b2 end along the first connection region 2132a to the end b1 end, as well as the other shape formed from the b4 end along the weakened region 2131 to the b1 end, then from the b1 end along the weakened region 2131 to the b3 end, and eventually from the b3 end along the second connection region 2132b to the b4 end. And two rings formed by the weakened region 2131 and the connection region 2132 may partially overlap, for example, a region from the b4 end to the b1 end in the weakened region 2131.

In yet other embodiments, as shown in FIG. 7, the number of the connection region 2132 is also two, that is, a third connection region 2132c and a fourth connection 2132d, where the third connection region 2132c is shown by a dashed line between a c1 end and a c2 end, and the connection region 2132d is shown by a dashed line between a c3 end and a c4 end, where the c1 end is an end connecting the weakened region 2131 and the third connection region 2132c, the c2 end is the other end connecting the weakened region 2131 and the third connection region 2132c, the c3 end is an end connecting the weakened region 2131 and the fourth connection region 2132d, and the c4 end is the other end connecting the weakened region 2131 and the fourth connection region 2132d. The number of the ring formed by the weakened region 2131 and the connection region 2132 is two, that is, a shape formed from the c1 end along the weakened region 2131 to the c4 end, then from the c4 end along the weakened region 2131 to the c2 end, and eventually from the c2 end along the third connection region 2132c to the c1 end, as well as the other shape formed from the c4 end along the weakened region 2131 to the c1 end, then from the c1 end along the weakened region 2131 to the c3 end, and eventually form the c3 end along the fourth connection region 2132d to the b4 end. And two rings formed by the weakened region 2131 and the connection region 2132 may partially overlap, for example, a region from the c4 end to the c1 end in the weakened region 2131.

Figure 8:
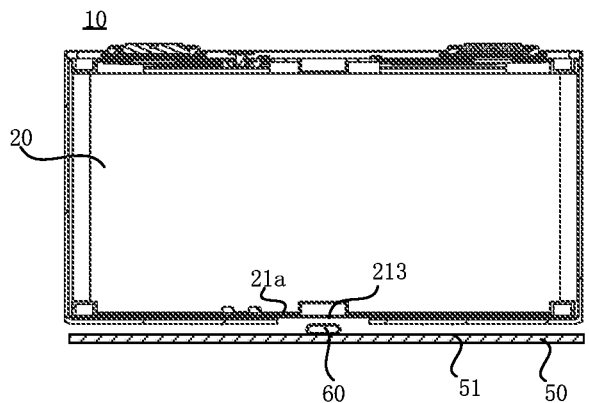
FIG. 8 is a cross-sectional schematic structural diagram of a battery disclosed in some embodiments of the present application.

FIG. 8 is a cross-sectional schematic structural diagram of the battery 10 provided in an embodiment of the present application, where the pressure relief mechanism 213 in FIG. 8 is not actuated. As shown in FIG. 8, the battery 10 may include the battery cell 20, a thermal management component 50 and a support 60.

The battery cell 20 includes the pressure relief mechanism 213, the pressure relief mechanism 213 is disposed on the first wall 21a of the battery cell 20, and the pressure relief mechanism 213 is configured to be actuated when an internal pressure or temperature of the battery cell 20 reaches a threshold, to relieve the internal pressure. For example, the battery cell 20 may be a battery cell 20 shown in FIG. 4.

The support 60 is arranged opposite to the pressure relief mechanism 213, the support 60 is configured to support the pressure relief mechanism 213when the pressure relief mechanism 213 is actuated, so that the pressure relief mechanism 213 is opened at a predetermined angle, therefore the emissions from the battery cell 20 can be discharged toward the thermal management component 50.

In some embodiments, as shown in FIG. 8, when the pressure relief mechanism 213 is not actuated, there is a gap between the support 60 and the pressure relief mechanism 213, and the gap is configured to provide open space for the pressure relief mechanism 213, so that the pressure relief mechanism 213 may be smoothly actuated, and the emissions from the battery cell 20 may be smoothly discharged from the pressure relief mechanism 213.

In some embodiments, due to a limited internal space of the battery 10, in order that the pressure relief mechanism 213 may be opened at a large enough predetermined angle when it is actuated, an orthographic projection of a farthest point in the weakened region 2131 on a first surface 51 of the thermal management component 50 is staggered from an orthographic projection of the support 60 on the first surface 51, and the farthest point is a point farthest from the connection region 2132 on the weakened region 2131. This can ensure that the pressure relief mechanism 213 is ruptured at the weakened region 2131 and the weakened region 2131 can be opened at a large enough angle when the pressure relief mechanism 213 is actuated, so that the emissions discharged through the pressure relief mechanism 213 have a large enough contact region with the thermal management component 50, bringing a better cooling effect. In this case, the weakened region 2131 may be opened at a large enough angle, which can reduce the problem of the further thermal runaway of the battery cell 20 caused by an untimely discharge of the emissions due to a small angle opened by the weakened region 2131.

Optionally, the farthest point may be one or more. In the case where there are multiple farthest points, it is only necessary that an orthographic projection of at least one of the farthest points on the first surface 51 is staggered from the orthographic projection of the support 60 on the first on the first surface 51.

Figure 9:
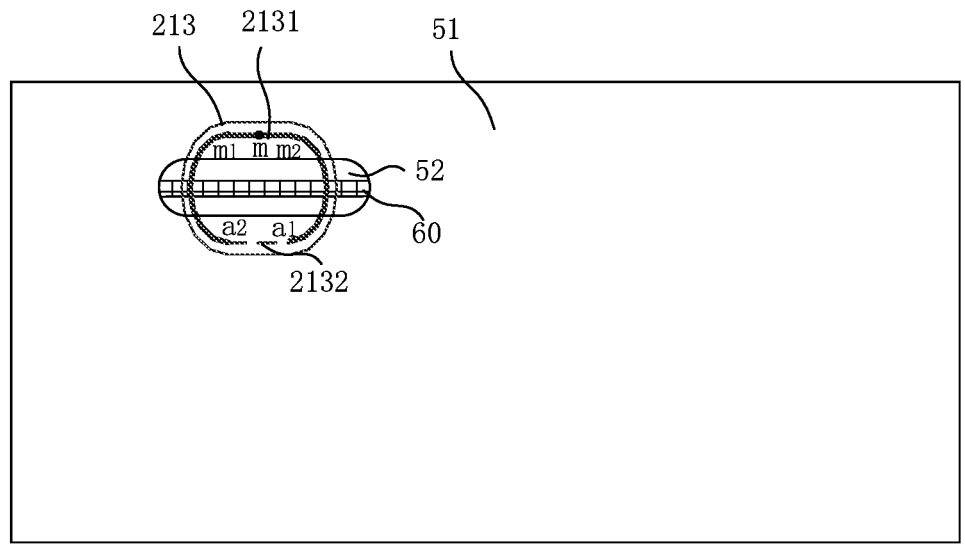
FIG. 9 is a schematic structural diagram of an orthographic projection of a pressure relief mechanism on a first surface of a thermal management component disclosed in some embodiments of the present application.
Figure 10:
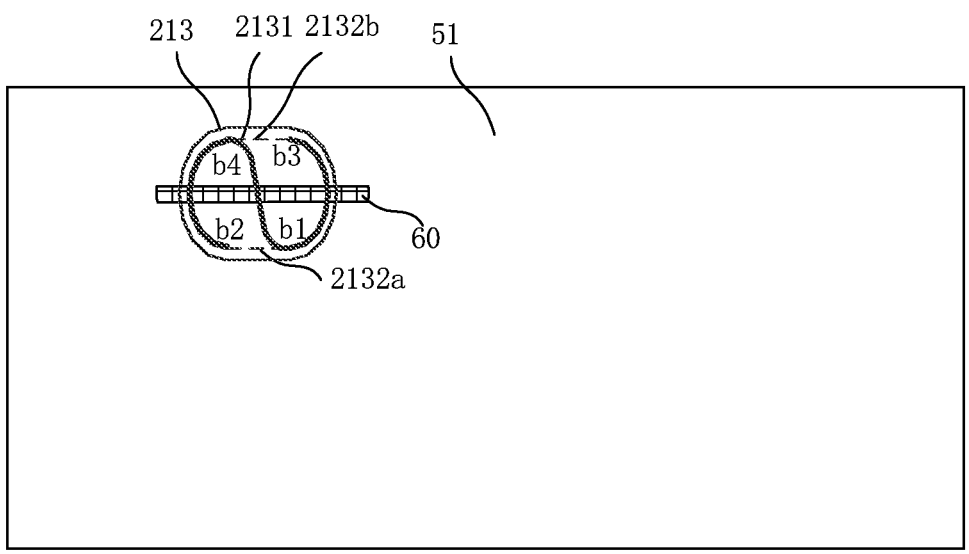
FIG. 10 is a schematic structural diagram of an orthographic projection of another pressure relief mechanism on a first surface of a thermal management component disclosed in some embodiments of the present application.
Figure 11:
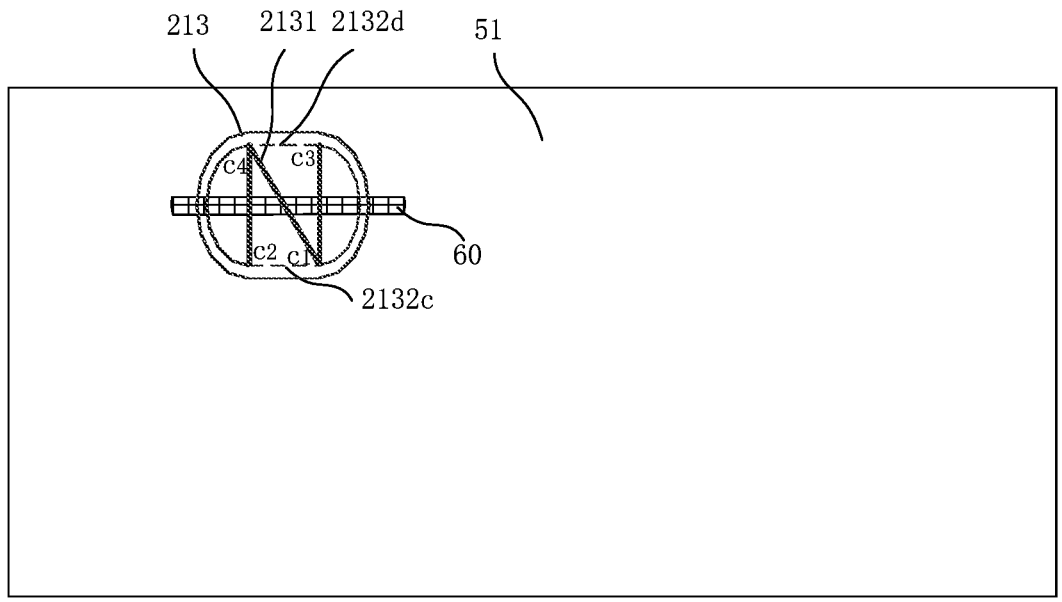
FIG. 11 is a schematic structural diagram of an orthographic projection of yet another pressure relief mechanism on a first surface of a thermal management component disclosed in some embodiments of the present application.

For example, FIGS. 9-11 are respectively schematic structural diagrams of an orthographic projection of a pressure relief mechanism on a first surface of a thermal management component provided in the embodiment of the present application, where FIGS. 9-11 show one support 60 and one pressure relief mechanism 213.

As shown in FIG. 9, a weakened region 2131 is a "C"-shaped indentation, and a farthest point in the weakened region 2131 is any point on a region corresponding to the connection region 2132 (that is, a region from an end m1 to an end m2). For convenience of description, the farthest point is denoted as an m point. In this case, an orthographic projection of the m point on the first surface 51 is staggered from the orthographic projection (a shaded part as shown in FIG. 9) of the support 60 on the first surface 51.

As shown in FIG. 10, a weakened region 2131 is an "S"-shaped indentation, and a farthest point in the weakened region 2131 includes a farthest point between the weakened region 2131 and the first connection region 2132a, and a farthest point between the weakened region 2131 and the second connection region 2132b, where the farthest point between the weakened region 2131 and the first connection region 2132a is a b4 point, and the farthest point between the weakened region 2131 and the second connection region 2132b is a b1 point. In this case, orthographic projections of the b1 point and the b2 point on the first surface 51 are respectively staggered from the orthographic projection (a shaded part as shown in FIG. 10) of the support 60 on the first surface 51.

As shown in FIG. 11, a weakened region 2131 is an "Z"-shaped indentation, and a farthest point in the weakened region 2131 includes a farthest point between the weakened region 2131 and the third connection region 2132c, and a farthest point between the weakened region 2131 and the fourth connection region 2132d, where the farthest point between the weakened region 2131 and the third connection region 2132c is a c3 point, and the farthest point between the weakened region 2131 and the fourth connection region 2132d is a c2 point. In this case, orthographic projections of the c3 point and the c2 point on the first surface 51 are respectively staggered from the orthographic projection (a shaded part as shown in FIG. 11) of the support 60 on the first surface 51.

In some embodiments, in order that the pressure relief mechanism 213 may be opened at a large enough predetermined angle when it is actuated, an extension direction of the support 60 may also be parallel to an extension direction of the connection region 2132, where the extension direction of the connection region 2132 is a direction pointing from one end connecting the connection region 2132 and the weakened region 2131 to the other end connecting the connection region 2132 and the weakened region 2131, and the extension direction of the support 60 is a length direction of the support 60. Therefore, the weakened region 2131 may be opened at a certain predetermined angle, the emissions discharged from the battery cell 20 may be discharged toward the thermal management component 50 along an angle opened by the weakened region 2131, reducing the risk of the emissions and increasing the safety of the battery 10.

Optionally, in an embodiment in which there are two connection regions 2132, the extension direction of at least one connection region 2132 of the two connection regions 2132 is parallel to the extension direction of the support 60.

As shown in FIG. 9, the extension direction of the connection region 2132 is a direction from a1 to a2 (or a direction from a2 to a1), and the extension direction of the support 60 is the length direction of the support 60, that is, the direction from a1 to a2 (or the direction from a2 to a1) is parallel to the length direction of the support 60.

As shown in FIG. 10, an extension direction of the connection region 2132a is a direction from b1 to b2 (or a direction from b2 to b1), and the extension direction of the support 60 is the length direction of the support 60, that is, the direction from b1 to b2 (or the direction from b2 to b1) is parallel to the length direction of the support 60. An extension direction of the second connection region 2132b is a direction from b3 to b4 (or a direction from b4 to b3), and the extension direction of the support 60 is the length direction of the support 60, that is, the direction from b3 to b4 (or the direction from b4 to b3) is parallel to the length direction of the support 60.

As shown in FIG. 11, an extension direction of the third connection region 2132c is a direction from c1 to c2 (or a direction from c2 to c1), and the extension direction of the support 60 is the length direction of the support 60, that is, the direction from c1 to c2 (or the direction from c2 to c1) is parallel to the length direction of the support 60. An extension direction of the fourth connection region 2132d is a direction from d3 to d4 (or a direction from d4 to d3), and the extension direction of the support 60 is the length direction of the support 60, that is, the direction from d3 to d4 (or the direction from d4 to d3) is parallel to the length direction of the support 60.

Figure 12:
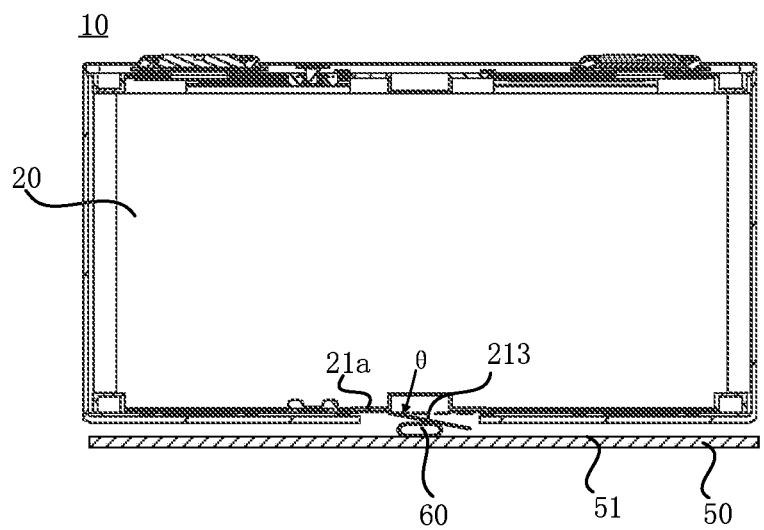
FIG. 12 is a cross-sectional schematic structural diagram of another battery disclosed in some embodiments of the present application.

FIG. 12 is a cross-sectional schematic structural diagram of a battery 10 provided in an embodiment of the present application, wherein the pressure relief mechanism 213 shown by a dashed line in FIG. 12 is not actuated, and the pressure relief mechanism 213 shown by a solid line in FIG.

12 is actuated. As shown in FIG. 12, when the pressure relief mechanism 213 is actuated, the support 60 may support the pressure relief mechanism 213, so that the pressure relief mechanism 213 is opened at a predetermined angle θ, therefore the emissions from the battery cell 20 can be discharged toward the thermal management component 50. In this way, the emissions may be discharged toward the thermal management component 50 and away from the battery cell 20 along a predetermined angle opened by the pressure relief mechanism 213, reducing the risk caused thereby and enhancing the safety of the battery 10.

Figures 13, 14:
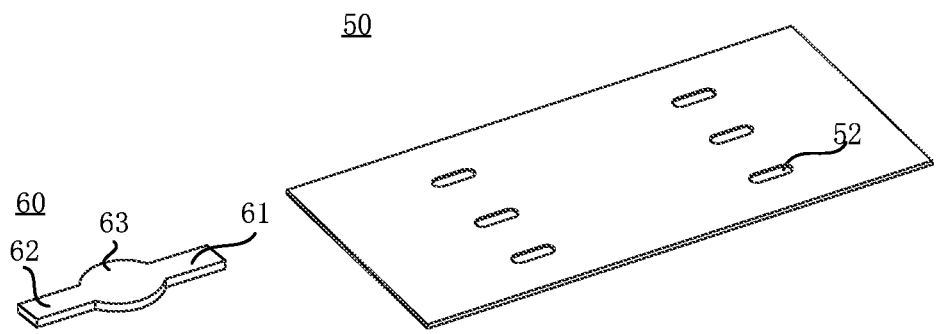
FIG. 13 is a schematic structural diagram of a support disclosed in the embodiment of the present application.
FIG. 14 is a schematic structural diagram of a thermal management component disclosed in some embodiments of the present application.

Optionally, a structure of the support 60 is a strip structure. In some embodiments, a width of the support 60 of the strip structure is uniform, that is, the support 60 is a cuboid structure. In other embodiments, in order to increase a rigidity of the support, a width of an intermediate region of the support 60 of the strip structure may be set to be greater than that of two end regions of the support 60 of the strip structure. For example, FIG. 13 is a schematic structural diagram of a support provided in the embodiment of the present application. As shown in FIG. 13, the support 60 includes a third portion 61, a fourth portion 62 and a fifth portion 63, the third portion 61 and the fourth portion 62 are strip structures, the fifth portion 63 is a cylindrical structure, and widths of the third portion 61 and the fourth portion 62 are both smaller than that of the fifth portion 63. Of course, it should be understood that the support 60 may be a cylindrical, square or other structures, as long as it can support the pressure relief mechanism 213.

Optionally, in some embodiments, the support 60 may use a material with a melting point lower than 600° C., for example, the support 60 may use aluminum or copper. In other embodiments, the support 60 may use organic material, for example, the support 60 may use polypropylene (PP) material.

It should be understood that when the pressure relief mechanism 213 is actuated and the weakened region 2131 is opened at a predetermined angle, the support 60 is mainly configured to support the weakened region 2131 of the pressure relief mechanism 213. If the support 60 still supports the pressure relief mechanism 213 after a continuous thermal runaway of the battery cell 20, the emissions may not be smoothly and quickly discharged, resulting in a further thermal runaway of the battery cell 20, or even an explosion. Therefore, the support 60 may be melted at high temperature, which facilitates a subsequent discharge of the emissions from the battery cell 20, further improving the safety of the battery 10.

The thermal management component 50 is configured to accommodate the fluid to adjust the temperature of the battery cell 20. In the case of cooling the battery cell 20, the thermal management component 50 may accommodate a cooling medium to adjust the temperature of the plurality of battery cell 20. In this case, the thermal management component 50 may also be called a cooling component, a cooling system or a cooling plate, etc. In addition, the thermal management component 50 can also be used for heating, which is not limited by the embodiments of the present application. Optionally, the fluid accommodated in the thermal management component 50 may flow in a circulating manner to achieve a better temperature regulation effect.

The first surface 51 of the thermal management component 50 is attached to the first wall 21a of the battery cell 20, that is, a wall of the battery cell 20 provided with the pressure relief mechanism 213 faces the thermal management component 50. In this way, when the pressure relief mechanism 213 is actuated, the emissions from the battery cell 20 may be discharged toward the thermal management component 50.

It should be understood that the first surface 51 of the thermal management component 50 is attached to the first wall 21a of the battery cell 20, which means that the first surface 51 of the thermal management component 50 directly or indirectly contacts the first wall 21a of the battery cell 20, so that heat of the battery cell 20 can be transferred to the thermal management component 50 to adjust the heat of the battery cell 20.

FIG. 14 is a schematic structural diagram of another thermal management component disclosed some embodiments of the present application. In some embodiments, as shown in FIG. 14, the thermal management component 50 is provided with a pressure relief hole 52, the pressure relief hole 52 is arranged opposite to the pressure relief mechanism 213, and the pressure relief hole 52 is configured to discharge the emissions. Since the pressure relief hole 52 is arranged opposite to the pressure relief mechanism 213, and the pressure relief mechanism 213 is arranged opposite to the support 60, the pressure relief hole 52 is also arranged opposite to the support 60. Therefore, by arranging the pressure relief hole 52 corresponding to the pressure relief mechanism 213 on the thermal management mechanism 50, when the pressure relief mechanism 213 is actuated, the emissions discharged from the battery cell 20 at a predetermined angle can pass through the thermal management component 50 and be discharged toward a side away from the battery cell 20, reducing the risk of the emissions and improving the safety of the battery 10.

In some embodiments, the support 60 covers part of the pressure relief hole 52. For example, an area of the support 60 covering the pressure relief hole is less than or equal to 30% of an area of the pressure relief hole 52, so that the support 60 cannot cover the pressure relief hole 52 too much, and when the pressure relief mechanism 213 is actuated, the emissions from the battery cell 20 can pass through the thermal management component 50 in time and be discharged toward the side away from the battery cell 20, without accumulating at the thermal management component 50.

Optionally, one pressure relief hole 52 may correspond to one or more pressure relief mechanisms 213.

Figure 15:
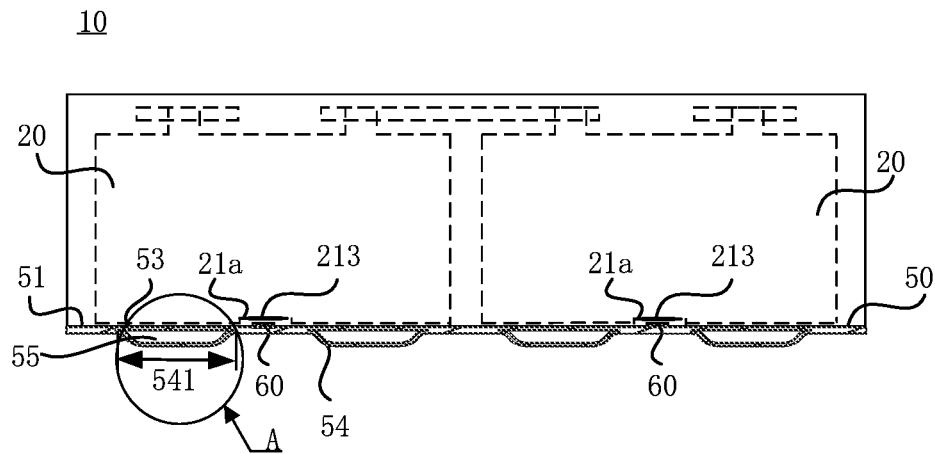
FIG. 15 is a schematic structural diagram of another battery disclosed in some embodiments of the present application.
Figure 16:
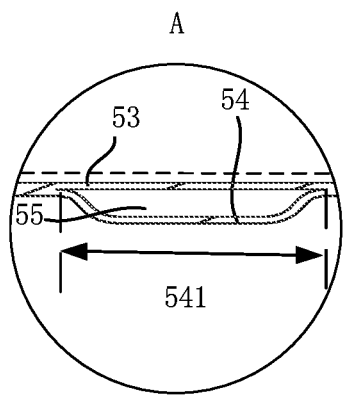
FIG. 16 is an enlarged schematic structural diagram of a part A of the battery shown in FIG. 15.

FIG. 15 is a schematic structural diagram of a battery disclosed some embodiments of the present application. FIG. 16 is an enlarged schematic structural diagram of a part A of the battery shown in FIG. 15. In some embodiments, as shown in FIG. 15, the thermal management component 50 may further include a first thermally conductive plate 53 and a second thermally conductive conducting plate 54. The first thermally conductive plate 53 is located between the first wall 21a and the second thermally conductive plate 54 and is attached to the first wall 21a. The first thermally conductive plate 53 and the second thermally conductive plate 54 form a flow channel 55 for accommodating the fluid. As shown in FIG. 16, a first region 541 of the second thermally conductive plate 54 is recessed away from the first thermally conductive plate 53 to form a groove. In this way, the flow channel 55 is formed in the groove.

Optionally, the pressure relief hole 52 may be disposed on a second region of the thermal management component 50, and the second region is not a region corresponding to the flow channel 55. For example, the pressure relief hole 52 may be disposed on a region other than the first region 541 of the thermal management component 50.

Optionally, the thermal management component 50 is configured to be damaged by the emissions discharged at the predetermined angle when the pressure relief mechanism 213 is actuated, so that the fluid in the thermal management component 50 is discharged from the interior of the thermal management component 50, thereby cooling the battery cell 20. In addition, due to existence of the weakened region 2131 and the support 60 on the pressure relief mechanism 213, when the pressure relief mechanism 213 is actuated, the support 60 can support the weakened region 2131 of the pressure relief mechanism 213, so that the weakened region 2131 is opened at a predetermined angle and the emissions from the battery cell 20 can be concentratedly discharged toward the thermal management component 50 along the predetermined angle, in this way, the thermal management component 50 can be damaged more quickly, improving a rapid response capability of the thermal management component 50 to the thermal runaway of the battery cell 20.

Optionally, in order to achieve that the thermal management component 50 can be easily damaged by the emissions, a temperature-sensitive material may be disposed on the thermal management component 50. The temperature-sensitive material on the thermal management component 50 is configured to be melted by the emissions discharged at the predetermined angle when the pressure relief mechanism 213 is actuated, so that the fluid is discharged from the interior of the thermal management component 50, thereby cooling the battery cell 20. In some embodiments, the temperature-sensitive material is disposed on a region of the thermal management component 50 facing the emissions discharged at the predetermined angle and a region adjacent to the region. For example, the temperature-sensitive material may be disposed on a sidewall of the pressure relief hole 52 or a region around the pressure relief hole 52 on the first surface 51 of the thermal management component 50.

In some embodiments, the thermal management component 50 may be accommodated in a second portion 112 of a box, and the first surface 51 of the thermal management component 50 faces away from the bottom of the second portion 112.

Figure 17:
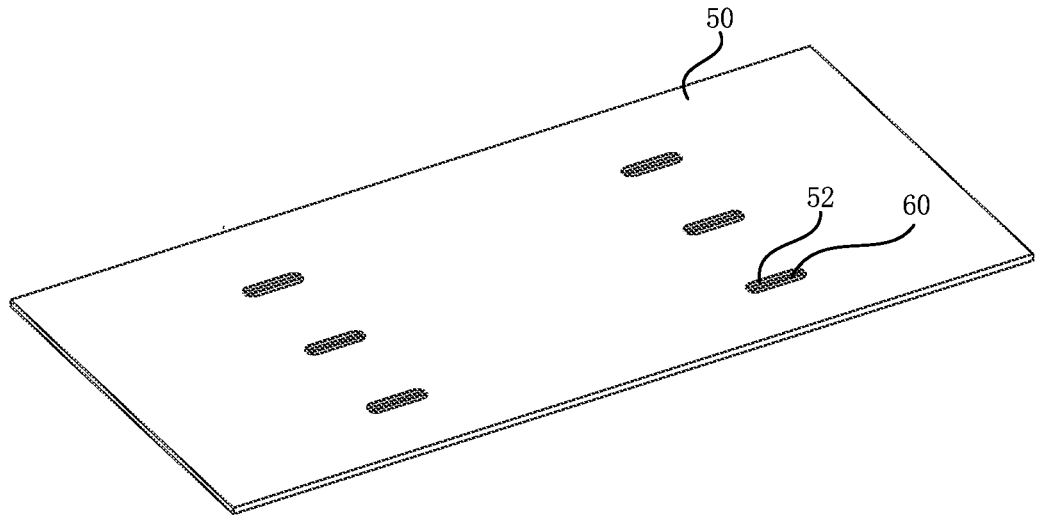
FIG. 17 is a schematic structural diagram of a thermal management component disclosed in the embodiment of the present application.
Figure 18:
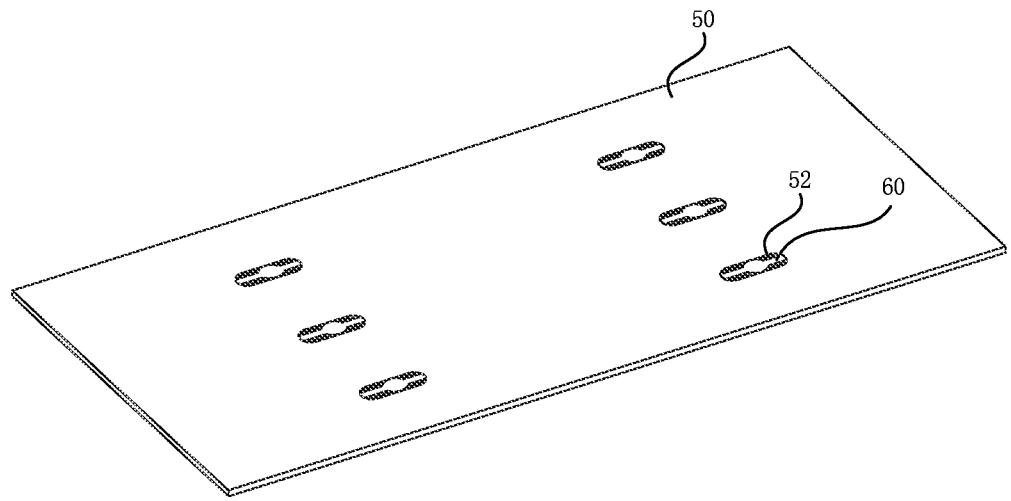
FIG. 18 is a schematic structural diagram of another thermal management component disclosed in the embodiment of the present application.

In some embodiments, the support 60 may be disposed in the thermal management component 50, so that space in the thermal management component 50 can be fully utilized, which makes a structure of the battery 10 compact, improving an energy density of the battery 10. For example, FIG. 17 and FIG. 18 are respectively schematic structural diagrams of another thermal management component 50 provided in the embodiment of the present application. As shown in FIG. 17 and FIG. 18, the support 60 may be disposed in the pressure relief hole 52 of the thermal management component 50, where the difference between FIG. 17 and FIG. 18 is that the structure of the support 60 is different.

Figure 19:
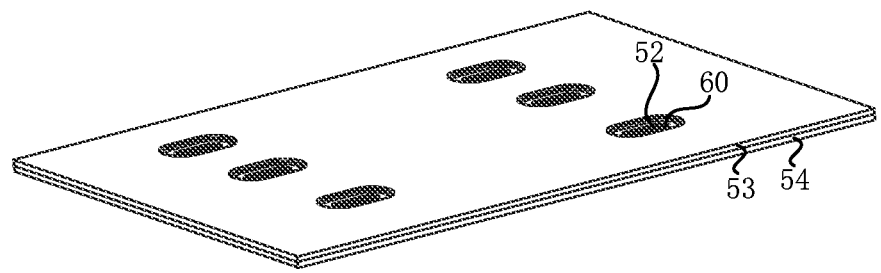
FIG. 19 is a schematic structural diagram of yet another thermal management component disclosed in the embodiment of the present application.
Figure 20:
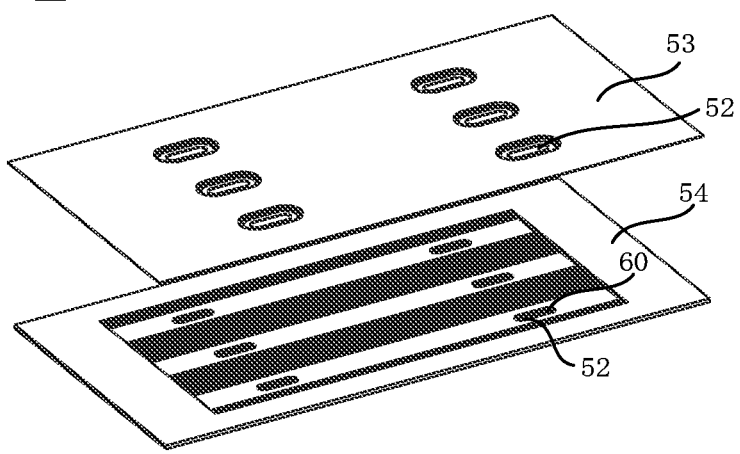
FIG. 20 is an exploded schematic structural diagram of the thermal management component shown in FIG. 19.

In the embodiment in which the thermal management component 50 includes the first thermally conductive plate 53 and the second thermally conductive plate 54, and in some embodiments, the pressure relief hole 52 penetrates the first thermally conductive plate 53 and the second thermally conductive plate 54, and the support 60 is disposed in the pressure relief hole 52 of the second thermally conductive plate 54. FIG. 19 is a schematic structural diagram of yet another thermal management component disclosed the embodiment of the present application, and FIG. 20 is an exploded schematic structural diagram of a thermal management component shown in FIG. 19. In other embodiments, as shown in FIG. 19 and FIG. 20, the pressure relief hole 52 penetrates the first thermally conductive plate 53 and the second thermally conductive plate 54, and the support 60 is disposed in the pressure relief hole 52 of the second thermally conductive plate 54.

In this case, in some embodiments, in order to facilitate processing, the support 60 and the thermal management component 50 are integrally formed. For example, when manufacturing the thermal management component 50, two holes may be processed on thermal management component 50, and the support 60 is formed between the two holes. In other embodiments, the support 60 may also be welded or bonded in the pressure relief hole 52.

In other embodiments, the support 60 may also be disposed between the thermal management component 50 and the battery cell 20. Optionally, the support 60 may be welded or bonded between the thermal management component 50 and the battery cell 20.

In some embodiments, the support 60 may also be a hollow structure, and the fluid is accommodated in the support 60, the support 60 is configured to be damaged by the emissions when the pressure relief mechanism 213 is actuated, so that the fluid in the support 60 is discharged to reduce the temperature of the emissions from the battery cell 20.

Figure 21:
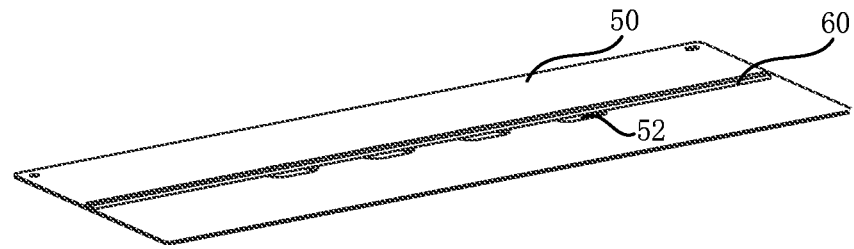
FIG. 21 is a schematic structural diagram of a combination of a support and a thermal management component disclosed in the embodiment of the present application.
Figure 22:
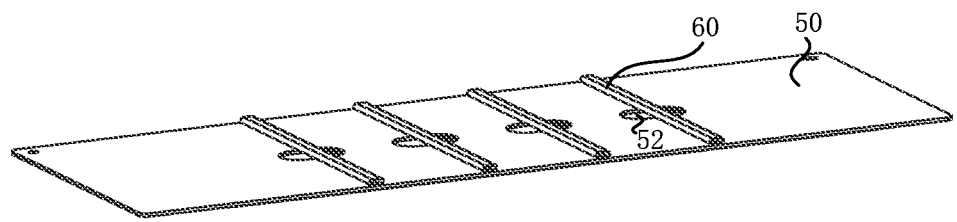
FIG. 22 is a schematic structural diagram of another combination of a support and a thermal management component disclosed in the embodiment of the present application.

In some embodiments, in order to reduce cost, a plurality of pressure relief holes 52 are arranged opposite to one support 60. For example, FIG. 21 and FIG. 22 are respectively schematic structural diagrams of a combination of a support and a thermal management component provided in the embodiment of the present application. As shown in FIG. 21, four pressure relief holes 52 arranged in a single row or a single column may correspond to one support 60. In other embodiments, one pressure relief hole 52 is arranged opposite to one support 60, that is, the number of pressure relief holes 52 is equal to the number of supports 60. For example, as shown in FIG. 22, each of the four pressure relief holes 52 may correspond to one support 60.

Optionally, in some embodiments, a box (for example, a box formed by the first part 111 and the second part 112 as shown in FIG, 2) accommodating the battery 10 may include an electrical chamber, the thermal management component 50, and a collection chamber. The electrical chamber is configured to accommodate the plurality of battery cells 20, the thermal management component 50 is configured to isolate the electrical chamber and the collection chamber, and the collection chamber is used to collect the emissions from the battery cell 20 provided with the pressure relief mechanism 213 when the pressure relief mechanism 213 is actuated.

The electrical chamber for accommodating the battery cell 20 is separated from the collection chamber for collecting the emissions by means of thermal management component 50. When the pressure relief mechanism 213 is actuated, the emissions from the battery cell 20 enter the collection chamber, rather than the electrical chamber or with a little thereof entering the electrical chamber, so that an electrical connection in the electrical chamber may not be affected, thus enhancing the safety of the battery 10.

Optionally, in some embodiments, the box (for example, the box formed by the first part 111 and the second part 112 as shown in FIG, 2) accommodating the battery 10 may further include a protective member configured to protect the thermal management component 50. The protective member and the thermal management component 50 form the collection chamber, so as to effectively collect and buffer the emissions from the battery cell 20 and reduce the risk thereof.

An embodiment of the present application further provides a power consumption apparatus, which may include the battery 10 in each of the foregoing embodiments. Optionally, the power consumption apparatus may be a vehicle 1, a ship or a spacecraft.

The battery 10 and the power consumption apparatus according to the embodiments of the present application are described above, a method and an apparatus for producing a battery according to the embodiment of the present application may be described below. For the parts that are not described in detail, reference is made to the foregoing embodiments.

Figure 23:
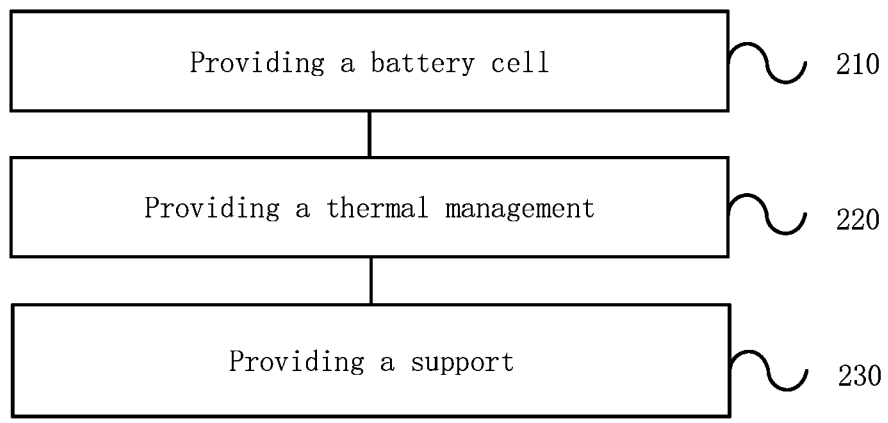
FIG. 23 is a schematic flowchart of a method for producing a battery disclosed in an embodiment of the present application.

FIG. 23 shows a schematic flowchart of a method 200 for producing a battery for an embodiment of the present application. As shown in FIG. 23, the method 200 may include:

S210, providing a battery cell, the battery cell comprising a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure;

S220, providing a thermal management being configured to accommodate a fluid to adjust the temperature of the battery cell, and a first surface of the thermal management component being attached to the first wall;

S230, providing a support, the support being arranged opposite to the pressure relief mechanism, the support being configured to support the pressure relief mechanism when the pressure relief mechanism is actuated, so that the pressure relief mechanism is opened at a predetermined angle, therefore emissions from the battery cell can be discharged toward the thermal management component.

Figure 24:
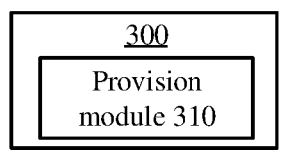
FIG. 24 is a schematic block diagram of an apparatus for producing a battery according to an embodiment of the present application.

FIG. 24 shows a schematic block diagram of an apparatus 300 for producing a battery for an embodiment of the present application. As shown in FIG. 24, the apparatus 300 for producing the battery may include a provision module 310.

The provision module 310 is configured to: provide a battery cell, the battery cell comprising a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure; provide a thermal management component being configured to accommodate a fluid to adjust the temperature of the battery cell, and a first surface of the thermal management component being attached to the first wall; and provide a support, the support being arranged opposite to the pressure relief mechanism, the support being configured to support the pressure relief mechanism when the pressure relief mechanism is actuated, so that the pressure relief mechanism is opened at a predetermined angle, therefore emissions from the battery cell can be discharged toward the thermal management component.

Although the present application has been described with reference to the preferred embodiments thereof, various improvements may be made to the present application and the components therein may be replaced with equivalents without departing from the scope of the present application. In particular, the technical features mentioned in each embodiments may be combined in any manner, as long as there is no structural conflict. The present application is not limited to the specific embodiments disclosed herein, but includes all technical solutions falling within the scope of the claims.

What is claimed is:

1. A battery, comprising:
a battery cell, the battery cell comprising a pressure relief mechanism, the pressure relief mechanism being disposed on a first wall of the battery cell, and the pressure relief mechanism being configured to be actuated when an internal pressure or temperature of the battery cell reaches a threshold, to relieve the internal pressure;
a thermal management component being configured to accommodate a fluid to adjust the temperature of the battery cell, and a first surface of the thermal management component being attached to the first wall; and
a support, the support being arranged opposite to the pressure relief mechanism, the support being configured to support the pressure relief mechanism when the pressure relief mechanism is actuated, so that the pressure relief mechanism is opened at a predetermined angle, therefore emissions from the battery cell can be discharged toward the thermal management component;
wherein the thermal management component is provided with a pressure relief hole, the pressure relief hole is arranged opposite to the pressure relief mechanism, and the pressure relief hole is configured to discharge the emissions.

2. The battery according to claim 1, wherein there is a gap between the support and the pressure relief mechanism, and the gap is configured to provide open space for the pressure relief mechanism.

3. The battery according to claim 1, wherein the pressure relief mechanism is provided with a weakened region and a connection region, the weakened region and the connection region form a ring, so that when the pressure relief mechanism is actuated, the pressure relief mechanism can be ruptured at the weakened region and be opened at a predetermined angle.

4. The battery according to claim 3, wherein an orthographic projection of a farthest point in the weakened region on the first surface is staggered from an orthographic projection of the support on the first surface, and the farthest point is a point farthest from the connection region on the weakened region.

5. The battery according to claim 4, wherein an extension direction of the support is parallel to an extension direction of the connection region, the extension direction of the connection region is a direction pointing from one end connecting the connection region and the weakened region to the other end connecting the connection region and the weakened region, and the extension direction of the support is a length direction of the support.

6. The battery according to claim 3, wherein a shape of the weakened region comprises at least one of the following: a "C" shape, a "Z" shape, and an "S" shape.

7. The battery according to claim 1, wherein a structure of the support is a strip structure.

8. The battery according to claim 7, wherein a width of an intermediate region of the strip structure is greater than that of two end regions of the strip structure.

9. The battery according to claim 1, wherein the support covers part of the pressure relief hole, and an area of the support covering the pressure relief hole is less than or equal to 30% of an area of the pressure relief hole.

10. The battery according to claim 1, wherein the support is arranged in the pressure relief hole.

11. The battery according to claim 10, wherein the support and the thermal management component are integrally formed.

12. The battery according to claim 1, wherein a plurality of pressure relief holes are arranged opposite to one support.

13. The battery according to claim 1, wherein one pressure relief hole is arranged opposite to one support.

14. The battery according to claim 1, wherein a structure of the support is a hollow structure, the support accommodates a fluid, the support is configured to be damaged by the emissions when the pressure relief mechanism is actuated, so that the fluid in the support is discharged, thereby reducing the temperature of the emissions from the battery cell.

15. The battery according to claim 1, wherein a melting point of the support is lower than 600° C.

16. The battery according to claim 1, wherein the thermal management component is configured to be damaged by the emissions discharged at the predetermined angle when the pressure relief mechanism is actuated, so that the fluid in the thermal management component is discharged from an interior of the thermal management component.

17. The battery according to claim 16, wherein the thermal management component is provided with a temperature-sensitive material, the temperature-sensitive material is configured to be melted by the emissions discharged at the predetermined angle when the pressure relief mechanism is actuated, so that the fluid is discharged from the interior of the thermal management component.

18. The battery according to claim 17, wherein the temperature-sensitive material is disposed on a region of the thermal management component facing the emissions discharged at the predetermined angle.

19. A power consumption apparatus, comprising: the battery according to claim 1.

* * * * *